United States Patent Office 3,052,493
Patented Sept. 4, 1962

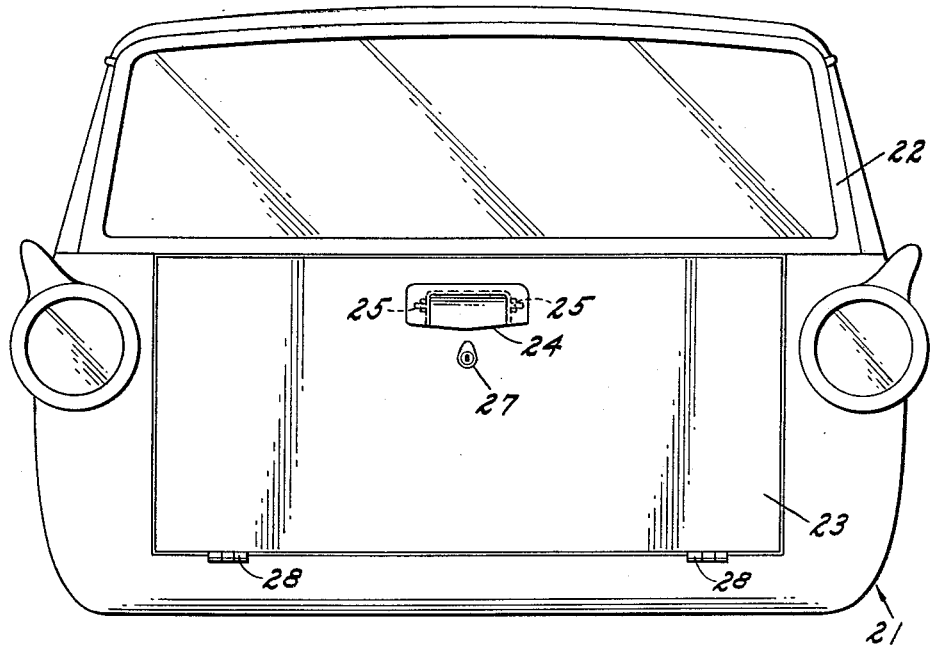
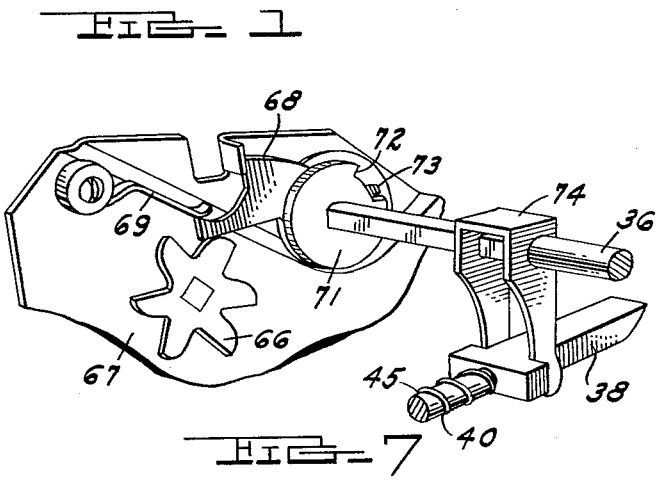

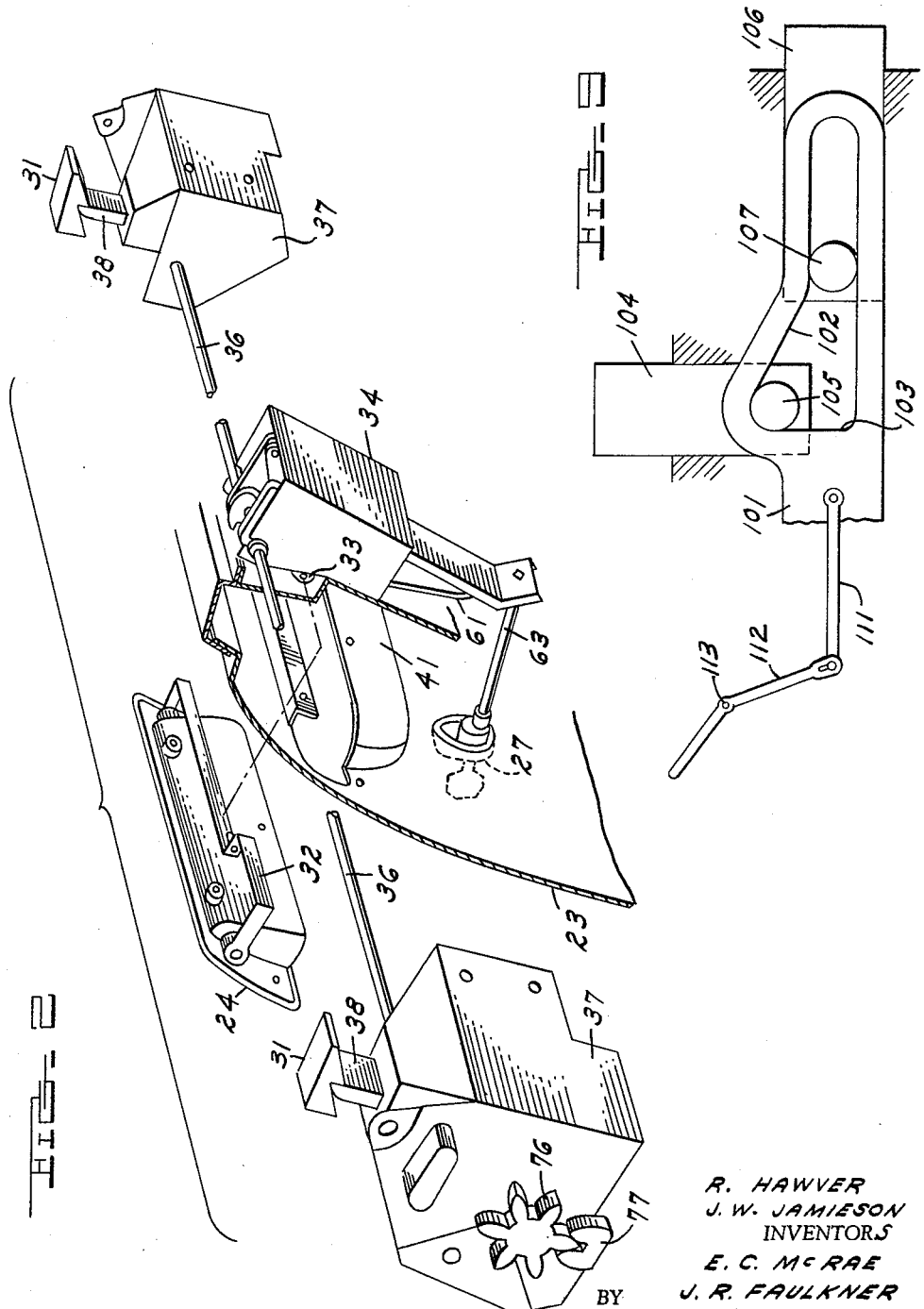

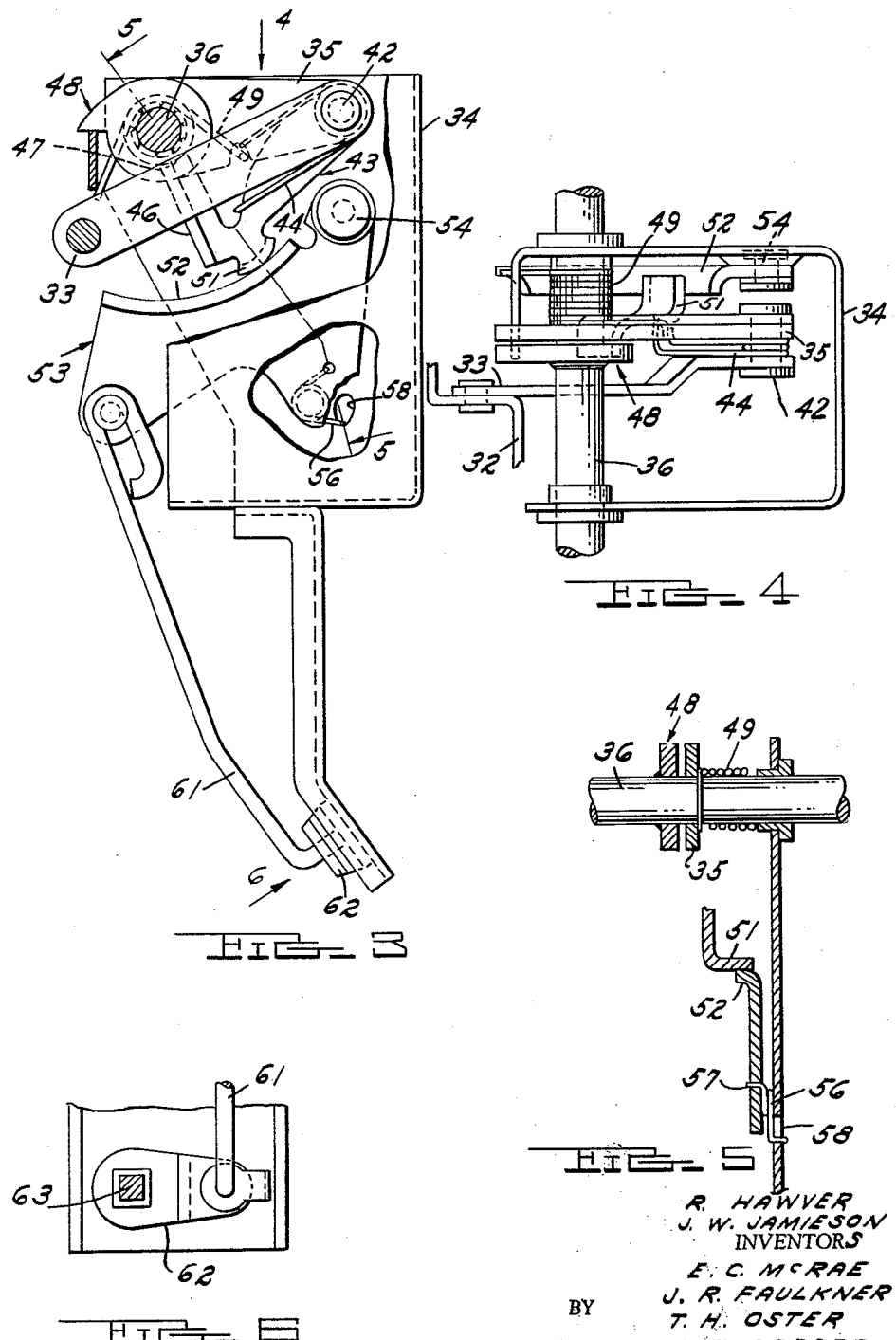

3,052,493
LATCHING MECHANISM
Roy Hawver, Pontiac, and John W. Jamieson, Dearborn, Mich., assignors to Ford Motor Company, Dearborn, Mich., a corporation of Delaware
Filed Aug. 31, 1956, Ser. No. 607,396
8 Claims. (Cl. 292—5)

This invention pertains to latching mechanisms and more particularly to that kind of mechanism which is usable for opening sequentially two or more gates.

It is an object of this invention to provide in a multiple gate assembly such as is found in the rear portion of motor vehicle utility or station wagons, a latching mechanism which by operation of one lever or a handle will first disengage one gate and then by subsequent lifting or opening of the same handle will release an additional gate.

Another object of this invention is to provide a locking mechanism for latches that will when locked preclude the possibility of forcing and hence breaking the lock and/or latching mechanism.

These and other objects will be more clearly understood with the following description of several embodiments pictured in drawings in which:

FIGURE 1 shows a rear view of a double gate installed in a closed position on a motor vehicle;

FIGURE 2 is a partially exploded pictorial view showing the general arrangement of the door handle with the torsion bar and its connection to latches controlling the opening of both the lift or upper gate and the lower or tail gate in the vehicle of FIGURE 1;

FIGURE 3 shows an elevational view partially broken away of the central latching and locking mechanism shown in FIGURE 2;

FIGURE 4 is a partial plan view of the mechanism shown in FIGURE 3;

FIGURE 5 is a partial sectional view taken along the line 5—5 of FIGURE 3 showing the position and connection of the rocker base spring;

FIGURE 6 is a view taken of the lock arm and base link from the general direction of the arrow designated 6 in FIGURE 3;

FIGURE 7 is a partial pictorial view of the ratchet and pawl arrangement along with the bolt and bolt arm of the tail gate in horizontal position shown in vertical or closed position in FIGURE 2;

FIGURE 8 is a pictorial view of a second embodiment of this invention wherein one rod movement opens sequentially first the vertical latch bolt and secondly the horizontal latch bolt; and FIGURE 9 is a view of another embodiment for sequential operation.

The preferred embodiment of the invention is shown in FIGURES 1 through 7. In FIGURE 1 is shown vehicle 21 having lift gate 22 and tail gate 23 hinged thereto. Located centrally of the vehicle is a handle 24 which is pivoted at 25 to tail gate 23 for outward motion when grasped from its underside and pulled outwardly. Lock 27 when actuated to the unlocked position shown in FIGURE 3 permits the handle 24 to be pulled back an initial amount unlatching the lift gate and subsequent movement, if desired, will open the tail gate allowing it to swing downwardly about hinges 28. Lift gate 22 may be hinged along its upper side to vehicle 21 so that it will extend approximately horizontally when opened.

FIGURE 2 is looking at the latching and locking mechanism from an inward position with only a portion of the tail gate 23 shown and with just the strikers 31 of lift gate 22 shown. Handle 24 is shown removed from its housing 41 in tail gate 23 and handle bar 32 is normally connected to rocker link 33 as shown by the dashed lines. Lock housing 34 supports torsion rod 36 and also the lock mechanism. On either end of torsion rod 36 is a latching mechanism 37 which is similar in operation and provides for first latching of the tail gate to the vehicle body and also latching of the lift gate to the tail gate. Latch bolt 38 cooperates with striker 31 to secure lift gate in fixed relation to the tail gate while rotor 76 cooperates with striker 77 to latch the tailgate to the vehicle body.

FIGURE 3 shows means for rotating torsion rod 36 and also the lock mechanism which is shown in an unlocked position. Rocker link 33 which is actuated by handle 24 is pivoted at pivot 42 to rocker 43 and arm 35. Spring 44 which is wound about pivot 42 and is hooked at its upper end to arm 35 and at its lower end to rocker 43 urges rocker 43 to a lower position. Tooth 46 of rocker 43 engages with cutout 47 of stops 48, which is fixed to rod 36, to rotate rod 36 clockwise as viewed in FIGURE 3 when rocker link 33 is pulled leftwardly by the opening movement of handle 24. Spring 49 which is wound about rod 36 urges stop 48 in a counterclockwise or closed direction. Foot 51 of rocker 43 during the opening movement slides along ramp 52 of rocker base 53 which is pivoted at 54 to housing 34. Spring 56 which is attached at one end to hole 57 in base 53 and the other to slot 58 in housing 34 urges base 53 upwardly in its present position but as base 53 is rotated counterclockwise about pivot 54, the spring will be compressed until about half way through its travel hole 57 will pass over slot 58 and the spring will start to expand urging base 53 downwardly insuring a complete movement about pivot 54. Base link 61 is attached at its upper end to base 53 and its lower end to lock lever 62 which is also shown in FIGURE 6. Lock lever 62 is turned by lock rod 63 shown in FIGURES 2 and 6 and when turned moves base link 61 downwardly.

In FIGURE 4 is a plan view showing housing 34, pivots 42 and 54 and springs 44 and 49. Foot 51 is shown engaged with ramp 52 and rod 36 is shown journaled in housing 34. Rocker link 33 is shown attached to handle bar 32 which is attached to handle 24 as shown in FIGURE 2.

FIGURE 5 shows the journaling of rod 36 and also the position of spring 56, hole 57 and slot 58 in cross section. Flanged foot 51 is shown in engagement with ramp 52.

FIGURE 7 views a latching mechanism from an inside position. One of these mechanisms is placed on either end of rod 36. The mechanism is shown in a horizontal position. Ratchet 66 is pivoted to tail gate wall 67 and when pawl 68 is in a depressed position, to which it is urged by spring 69, ratchet 66 can turn in one direction only. However, when pawl 68 is lifted or rotated about rod 36 by disc 71, which is fixed to and rotates rod 36, ratchet 66 is free to rotate in either direction. Disc 71 has cutout 72 and when rotated in a clockwise direction engages tang 73 of pawl 68 also rotating it in a clockwise direction. It is seen that disc 71 will rotate for a portion of its cycle before tang 73 is engaged. Pawl 68 pivots about rod 36. Latch arm 74 is fixed to rod 36 and when rotated moves bolt 38 against the urging of spring 40 releasing it from striker 31. Rotor 76 shown in FIGURE 2 is fixed to and rotates with ratchet 66 so that when striker 77, also shown in FIGURE 2, and fixed to the vehicle body, can rotate rotor 76 in a closing direction but cannot be opened until pawl 68 is lifted permitting ratchet 66 to turn freely.

In FIGURE 8 is shown a second embodiment of this invention with striker 81 being attached to the lift gate and striker 82 being attached to the vehicle body with bolts 83 and 84 in the actuating assembly being mounted in the tail gate. Bell crank 86 when rotated by handle rod 87 pulls bolt 83 downwardly against spring 88 releasing striker 81. When flange 91 of crank 86 contacts L-shaped arm 92, bolt 84 is pulled away from striker 82 against the action of spring 93 thereby releasing striker 82. Therefore, it may be seen that by turning a conventional handle 89 about a pivot 90 rod 87 can be made to move leftwardly, initially releasing striker 81 while not moving bolt 84 or releasing striker 82 until the flanged portion 91 contacts arm 92. In this manner the lift gate and tail gate can be controlled by the movement of one rod with one being opened before the other.

FIGURE 9 shows a third embodiment wherein arm 101 having cutout 103 moves bolts 104 and 106 which are engageable with strikers or other latching mechanism not shown. Arm 101 is connected by link 111 to a conventionally operated lever 112 which is pivotable about pivot 113. Initial movement of lever 112 results in the movement of arm 101 which causes pin 105 which is fixed to bolt 104 to move downwardly releasing the latch and further movement of arm 101 will cause pin 107 which is fixed to bolt 106 to move leftwardly.

In the operation of the embodiment shown in FIGURES 1 through 7 and in particular FIGURE 3, link 33 is pulled leftwardly causing rocker 43 to be pulled along ramp 52 turning rod 36 which, as may be seen by looking at FIGURE 7, initially moves bolt 38 against spring 40 releasing the lift gate and then a further movement of rod 36 will cause the cutout 72 in disc 71 to contact tang 73 rotating pawl 68 about shaft 36 releasing ratchet 66 allowing rotor 76 to turn freely and be released from striker 77. When the handle 24 is released spring 49 returns arm 35 which is pivoted about rod 36 to the initial position thereby causing rocker 43 to move upwardly and rightwardly along ramp 52.

In the locking of the latch shown in FIGURE 3 link 61 is moved downwardly by turning of arm 62, shown more clearly in FIGURE 6, causing base 53 to move counterclockwise about pivot 54. In the initial movement of base 53 spring 56 is compressed but when hole 57 passes over slot 58 the spring expands aiding instead of resisting the counterclockwise direction of base 53 thereby insuring a complete retraction. Spring 44 urges rocker 43 downwardly against ramp 52 disengaging tooth 46 so that any working of handle 24 and hence link 33 will merely cause foot 51 to travel back and forth on ramp 52 without turning or rotating torsion rod 36 thereby not affecting the movements or position of latch bolts 38 and pawl 68. It can be seen that by forcing handle 24 nothing will be accomplished and it will not be possible to open the latches. It is also seen that a comparatively trouble free simple and sturdy mechanism is provided.

It will be understood that the invention is not to be limited to the exact construction shown and described, but that various changes and modifications may be made without departing from the spirit and scope of the invention, as defined in the appended claims.

What is claimed is:

1. In a motor vehicle body having a pair of hinged gate members, a latching mechanism comprising a rotor mounted on one of said hinged gate members adapted to engage a striker mounted on the vehicle body, a spring urged ratchet finger normally in engagement with said rotor to restrict the latter to one-way rotation, a member engageable after a predetermined degree of travel thereof with said spring urged ratchet finger to lift the latter out of rotor restricting engagement, a latch bolt mounted on said one hinged gate member adapted to engage a striker mounted on the other hinged gate member, a swingably mounted arm, biasing means urging said latch bolt into engagement with said arm, said arm being swingable to move said latch bolt against the urging of said biasing means out of engagement with the striker engaged thereby, a rod coupled to both said member and said arm, outer manually operable means, and means coupling said outer manually operable means to said rod, said outer manually operable means being initially operative to move said rod to first swing said arm to disengage said latch bolt from the striker related thereto and to simultaneously move said member through said predetermined degree of travel, said outer manually operable means being further operative to further rotate said rod and said member beyond said predetermined degree of travel to cause the latter to engage said spring urged ratchet finger to lift the latter and release said rotor.

2. The structure defined by claim 1 in which the means coupling said outer manually operable means to said rod comprises a second arm pivotally supported at one end on said rod, a rocker pivotally connected to the other end of said arm, a member coupled to said rod, said rocker having a part thereof movable into and out of abutting relation to a part of said member, a pivotally mounted rocker base having an arcuate rocker surface, biasing means maintaining said rocker in engagement with said arcuate rocker surface, means operable to move said rocker base and thereby said rocker between a rod rotating position in which said rocker part is in abutting relation to said last mentioned member part or a rod nonrotating position in which said rocker part is in nonabutting relation to said last mentioned member part, and link means connected at one end to said outside operator and pivotally connected at the other end to said rocker, said link means being actuatable by said outer manually operable means to bodily shift said rocker along said arcuate rocker surface to rotate said rod when said rocker base and rocker are in said rod rotating position in which said rocker and rod parts are in abutting relation, said parts bypassing each other upon shiftable movement of said rocker along said arcuate rocker surface when said rocker base and rocker are in rod nonrotating position.

3. A latching mechanism for a combined passenger and luggage carrying vehicle body having a pair of hinged gate members at the rear of the vehicle and comprising in combination a movable outer manually operable handle mounted on one of said gate members, a latch mechanism mounted on the same gate member as said outer manually operable member, a first striker on said second gate member, a second striker on the vehicle body, said latch mechanism having holding means engageable with the first striker on said second gate member and second holding means engageable with the second striker on said vehicle body, and connecting means operative to transmit movement of said outer manually operable member to said first and second holding means, said connecting means including an operating member, a first means transmitting movement of said operating member to said first holding means to disengage the same from said first striker upon initial movement of said outer manually operable means, a second means coupling said operating member to said second holding means, said second means including means operative to disengage said second holding means only after continued movement of said outer manually operable means beyond said initial movement thereof.

4. A latching mechanism for a combined passenger and luggage carrying vehicle body having a pair of hinged gate members at the rear of the vehicle and comprising in combination a movable outer manually operable handle mounted on one of said gate members, a latch mechanism mounted on the same gate member as said outer manually operable member, a first striker on said second gate member, a second striker on the vehicle body, said latch mechanism having holding means engageable with the first striker on said second gate member and second holding means engageable with the second striker on said vehicle body, and connecting means operative to transmit movement of said outer manually operable member to said first and second holding means, said connecting means including an operating member, a first means transmitting movement of said operating member to said first holding means to disengage the same from said first striker upon initial movement of said outer manually operable means, a second means coupling said operating member to said second holding means, said second means including means operative to disengage said second holding means only after continued movement of said outer manually operable means beyond said initial movement thereof, said connecting means including means positionable to uncouple said handle from said operating member to render said outer manually operable means inoperative to disengage said holding means from said strikers.

5. In a vehicle body having a pair of closures swingably mounted thereon for movement between open and closed positions, a latch mechanism comprising first latch means on one of said closures operative to latch the other of said closures thereto, second latch means on said one of said closures operative to latch said one of said closures to said body, and a common operating means operatively interconnecting said first and second latch means and permitting release of said first latch means independently of release of said second latch means to allow said other of said closures to be moved to open position without movement of said one of said closures to open position.

6. In a station wagon type of vehicle body having an opening therein and a tail gate and lift gate mounted on said body for swinging movement oppositely to each other to open and close said opening, with said lift gate overlapping said tail gate in the closed position thereof, a latch mechanism comprising, first latch means on said tail gate operative to latch said lift gate thereto, second latch means on said tail gate operative to latch said tail gate to said body, and a common operating means operatively interconnecting said first and second latch means and permitting release of said first latch means independently of release of said second latch means to allow said lift gate to be moved to an open position without movement of said tail gate to an open position.

7. In a vehicle body having a pair of closures swingably mounted thereon for movement between open and closed positions, a latch mechanism comprising first latch means on one of said closures operative to latch the other of said closures thereto, second latch means on said one of said closures operative to latch said one of said closures to said body, and a common operating means operatively interconnecting said first and second latch means, said common operating means comprising a bell crank having one arm engageable with said first latch means and a second arm adapted to be coupled to a latch mechansim operating link, said second arm having an abutment thereon, and a pivoted member having an arm coupled to said second latch means, said abutment on said bell crank second arm being engageable with said pivoted member after a predetermined travel of said bell crank, said bell crank being operable to first release said first latch means and after said predetermined travel to release said second latch means.

8. In a vehicle body having a pair of closures swingably mounted thereon for movement between open and closed positions, a latch mechanism comprising first latch means on one of said closures operative to latch the other of said closures thereto, second latch means on said one of said closures operative to latch said one of said closures to said body, and a common operating means operatively interconnecting said first and second latch means, said common operating means comprising a slidable arm having a wedge-shaped cutout therein, said first latching means having a part thereof slidable along an inclined surface of said wedge-shaped cutout to urge said first latch means into unlatched position, and a lost motion connection between said slidable arm and said second latch means so that the latter is unlatched after said first latch means.

References Cited in the file of this patent
UNITED STATES PATENTS

| | | |
|---|---|---|
| 2,147,358 | Smith | Feb. 14, 1939 |
| 2,193,132 | Hynes | Mar. 12, 1940 |
| 2,253,660 | Tell | Aug. 26, 1941 |
| 2,256,465 | Brubaker | Sept. 23, 1941 |
| 2,263,065 | Baldauf | Nov. 18, 1941 |
| 2,507,196 | Dall | May 9, 1950 |
| 2,538,930 | Zummach | Jan. 23, 1951 |